No. 825,276. PATENTED JULY 3, 1906.
H. LEMP.
AUTOMOBILE.
APPLICATION FILED JAN. 24, 1906.
2 SHEETS—SHEET 2.
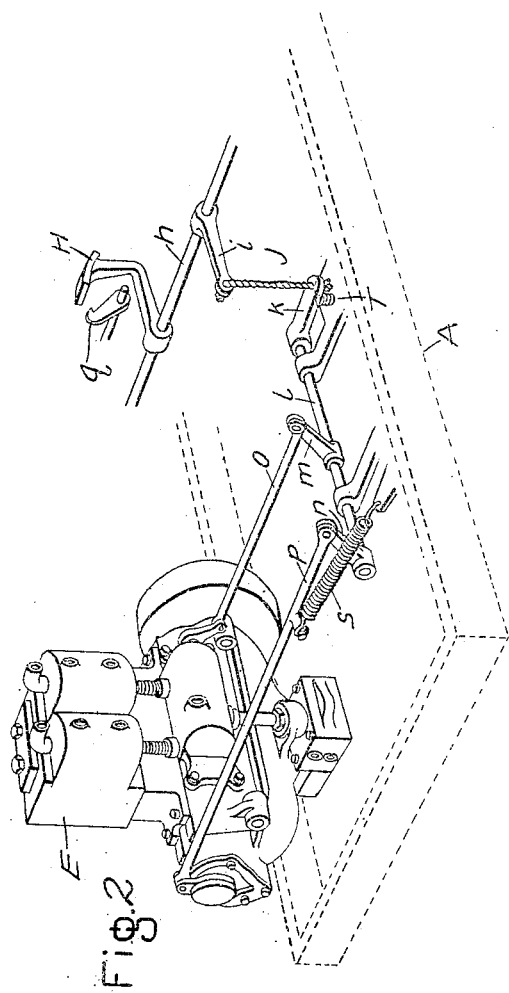
Witnesses:
Inventor:
Hermann Lemp.
by Albert G. Davis
Atty.

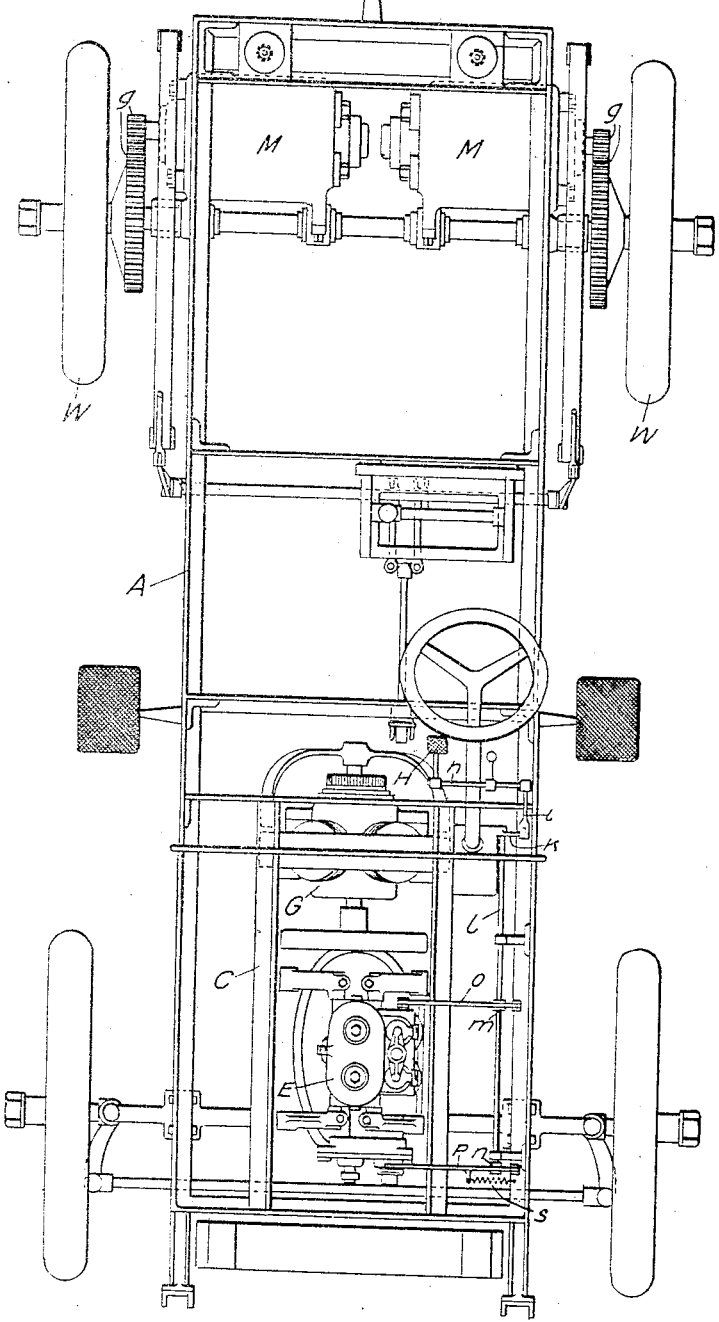

UNITED STATES PATENT OFFICE.

HERMANN LEMP, OF LYNN, MASSACHUSETTS, ASSIGNOR TO GENERAL ELECTRIC COMPANY, A CORPORATION OF NEW YORK.

AUTOMOBILE.

No. 825,276.   Specification of Letters Patent.   Patented July 3, 1906.

Original application filed January 14, 1904, Serial No. 188,958. Divided and this application filed January 24, 1906. Serial No. 297,575.

*To all whom it may concern:*

Be it known that I, HERMANN LEMP, a citizen of the United States, residing at Lynn, county of Essex, State of Massachusetts, have invented certain new and useful Improvements in Automobiles, of which the following is a specification.

This application is a division of my former application, Serial No. 188,958, filed January 14, 1904.

My invention relates to self-propelled vehicles, and has especial reference to that class of vehicles which derives its motive power from an electric generator driven by a prime mover—such, for instance, as an internal-combustion engine.

In vehicles equipped with a prime mover, electric generator, and driving-motors energized from the generator considerable flexibility of control may be obtained by varying the connections of the electric circuit while running the prime mover at substantially constant speed, and this is the method of control that has been employed ordinarily in the past in the operation of vehicles of this class. It is possible, however, to obtain a more even acceleration and greater economy of fuel by regulating the engine speed instead of varying the electrical connections. Furthermore, this method of control reduces the wear and tear on the engine, since the engine is operated at a speed adapted to the output required instead of running at full speed all the time, as with the usual method of control. Furthermore, the regulation of the engine speed may be obtained by a simple lever or pedal which requires less attention and less careful manipulation than an electric-circuit controller.

I have found that not only is it possible to control the speed of a vehicle over wide ranges by varying the engine speed, but also it is possible to bring the vehicle to rest and start it up again without in any way disturbing the electric circuits or bringing the engine to a complete stop. If the engine speed is reduced sufficiently, the induced generator voltage will fall to an amount insufficient to supply any appreciable current to the driving-motors, so that the vehicle will be allowed to coast under its own momentum or come to rest, as the case may be. Furthermore, by this method of control the engine may be kept running slowly while the vehicle is at rest, and since the generator is producing no appreciable amount of current and all moving parts are running at very low speed practically no power is wasted, and yet the vehicle is ready to start at a moment's notice without the necessity for starting the engine by hand, as would have to be done if the engine were brought completely to rest.

My invention in its broadest aspect consists in the combination in a self-propelled vehicle of a prime mover, an electric generator driven by the prime mover, an electric motor for driving the vehicle supplied with current from the generator, and means under the control of the operator for raising and lowering the speed of the prime mover above and below the critical speed of the generator. By "critical speed" I mean that speed at which the generator produces just sufficient voltage for supplying current for driving the motor or motors of the vehicle.

More specifically considered, my invention further comprises in addition to the above combination a spring or other suitable means for returning the speed-controlling means to its lowest-speed position when released by the operator, so that in order to cut off the power it is only necessary for the operator to release the pedal or lever which controls the engine speed.

My invention will best be understood by reference to the accompanying drawings, in which—

Figure 1 shows a plan view of an automobile with the car-body removed arranged in accordance with my invention, and Fig. 2 shows a perspective view of the controlling mechanism.

In the drawings, A represents the frame of the vehicle, to which are secured in the usual manner the bearings for the wheels W. Also secured to frame A is the auxiliary frame C, upon which are supported the prime mover or engine E and the generator G, the armature of which is mounted upon the shaft of engine E.

M M represent two electric motors, which are mounted upon the rear axle in the ordinary manner and each of which drives one of the rear wheels W through the gears $g$.

H represents a foot-pedal mounted on the shaft $h$, which carries the lever $i$. When the pedal H is depressed, the forward end of the lever $i$ is raised. The lever $i$ is connected by any suitable flexible connection, such as a chain or cord $j$, to the lever $k$, mounted upon the shaft $l$, which runs lengthwise of the carriage. Mounted on the shaft $l$ are two levers $m$ and $n$. The first of these carries a rod $o$, which is connected to the exhaust-valves of the engine in such a manner that the longitudinal motion of rod $o$ varies the lift of the exhaust-valves in a manner well understood in the art. By the variation of the lift of the exhaust-valves the mixture of the engine is regulated and the speed and torque of the engine varied. Lever $n$ is connected to the rod $p$, which operates the ignition device of the engine in such a manner that as rod $p$ is moved longitudinally the spark will be advanced or retarded in the well-known manner and further speed control of the engine thereby secured. The rods $o$ and $p$ are given sufficient range of movement to vary the engine speed over a wide range.

$s$ is a tension-spring attached to the rod $p$ and to the frame of the machine, tending to retract rod $p$, so as to rotate shaft $l$, to depress lever $k$, to rotate shaft $h$, and to lift pedal H— that is, to hold the several parts in the position shown against the yielding stop T.

The several parts are so adjusted that when they are held by the spring $s$ in the position shown in the drawings the position of the spark advance controlled by rod $p$ and the lift of the exhaust-valves controlled by rod $o$ are such that the engine will revolve at a speed below the critical speed of the generator—that is, at a speed too low to permit the generator to furnish sufficient current to the motors for driving the vehicle. The vehicle can thus be brought to rest at any time simply by removing all pressure from the pedal H. By pressing down the pedal H the speed of the engine is increased until the critical speed of the generator is reached. At this point the generator produces a sufficiently-high voltage to furnish a working current to the motors and the vehicle starts from rest. The vehicle may thus be started and stopped by means of the single pedal H without disturbing any of the connections of the electric circuit.

In Fig. 2 I have shown a pivoted catch $q$, which is adapted to engage pedal H and hold it in a slightly-depressed position while the engine is first being started by hand. After the engine is once started, the pedal H is further depressed to raise the engine speed above the critical speed of the generator, and catch $q$ is released and falls back into an inoperative position. It does not come again into use during the operation of the machine, since the vehicle is stopped and started without stopping the engine.

For the purpose of the control, as above described, I have found that a compound-wound generator is particularly suitable, since a compound machine will operate at a lower speed without losing its field magnetization than would be possible for a shunt-machine, and, furthermore, a compound-wound machine picks up more readily when brought up to speed with its armature-circuit closed through the motors. The use of a compound-wound machine is not essential, however, and satisfactory results can be obtained with shunt-wound generators.

What I claim as new, and desire to secure by Letters Patent of the United States, is—

1. In a self-propelled vehicle, a prime mover, an electric generator driven thereby, an electric motor driven by said generator, and means for lowering the speed of the prime mover below the critical speed of the generator without stopping the prime mover.

2. In a self-propelled vehicle, a prime mover, a compound-wound electric generator driven thereby, an electric motor driven by said generator, and means for raising and lowering the speed of the prime mover above and below the critical speed of the generator without disturbing the electrical connections.

3. In a self-propelled vehicle, an internal-combustion engine, an electric generator driven thereby, an electric motor driven by said generator, and means for advancing and retarding the spark and for regulating the mixture of the engine to raise and lower the engine speed above and below the critical speed of the generator.

4. In a self-propelled vehicle, a prime mover, an electric generator driven thereby, an electric motor for driving the vehicle supplied with current from said generator, and means under the control of the operator for raising and lowering the speed of said prime mover above and below the critical speed of said generator.

5. In a self-propelled vehicle, a prime mover, an electric generator driven thereby, an electric motor for driving the vehicle supplied with current from said generator, speed-controlling means for said prime mover arranged normally to maintain the speed of the prime mover below the critical speed of the generator, and a lever under the control of the operator operatively connected to said speed-controlling means.

6. In a self-propelled vehicle, a prime mover, an electric generator driven thereby, an electric motor for driving the vehicle supplied with current from said generator, means under the control of the operator for raising and lowering the speed of said prime mover above and below the critical speed of said generator, and a spring for returning said means to its lowest-speed position when released by the operator.

7. In a self-propelled vehicle, a prime mover, an electric generator driven thereby, an electric motor for driving the vehicle supplied with current from said generator, means under the control of the operator for raising and lowering the speed of said prime mover above and below the critical speed of said generator, a spring for returning said means to its lowest-speed position when released by the operator, and a catch for holding said means in another position at starting against the tension of said spring.

In witness whereof I have hereunto set my hand this 22d day of January, 1906.

HERMANN LEMP.

Witnesses:
JOHN A. McMANUS, Jr.,
HENRY O. WESTENDARP.